United States Patent [19]

Kowalski et al.

[11] Patent Number: 4,548,995
[45] Date of Patent: Oct. 22, 1985

[54] PROCESS FOR THE MANUFACTURE OF HALOGENATED POLYMERS

[75] Inventors: Ronald C. Kowalski, New Providence; William M. Davis; Neil F. Newman, both of Edison; Z. Andrew Foroulis, Mendham, all of N.J.; Francis P. Baldwin, Coupeville, Wash.

[73] Assignee: Exxon Research & Engineering Co., Florham Park, N.J.

[21] Appl. No.: 651,621

[22] Filed: Sep. 17, 1984

Related U.S. Application Data

[63] Continuation-in-part of Ser. No. 481,320, Apr. 1, 1983.

[51] Int. Cl.[4] ............................................. C08F 8/22
[52] U.S. Cl. .................................. 525/354; 525/330.3; 525/331.6; 525/331.7; 525/332.8; 525/332.9; 525/333.1; 525/333.2; 525/334.1; 525/355; 525/356; 525/359.1; 525/359.2; 525/359.3
[58] Field of Search ............ 525/354, 355, 356, 359.1, 525/359.2, 359.3

[56] References Cited

U.S. PATENT DOCUMENTS

| | | | |
|---|---|---|---|
| 3,023,191 | 2/1962 | Tegge et al. | 525/356 |
| 3,242,148 | 3/1966 | Kinchen et al. | 525/356 |
| 3,510,416 | 5/1970 | Vaccari et al. | 525/356 |
| 3,936,430 | 2/1976 | Schoen et al. | 525/356 |
| 4,185,057 | 1/1980 | Rossiter et al. | 264/40.1 |

FOREIGN PATENT DOCUMENTS

| | | |
|---|---|---|
| 1483063 | 8/1977 | United Kingdom . |
| 1483064 | 8/1977 | United Kingdom . |

*Primary Examiner*—Bernard Lipman
*Attorney, Agent, or Firm*—Harvey L. Cohen

[57] ABSTRACT

In a process for the continuous halogenation of polymers by contacting polymer and halogenating agent in a continuous flow device in which means are provided for disengaging reaction by-products and unreacted halogenating agent from the reaction mixture, by deforming and disrupting the halogenated polymer surface and injecting an inert gas into the halogenated polymers immediately after reaction thereby neutralizing the product. In a preferred embodiment the process is carried out in an extruder-reactor and an optional, supplementary inert gas scrubbing zone is included. The process is amenable to saturated and unsaturated polymers.

82 Claims, No Drawings

PROCESS FOR THE MANUFACTURE OF HALOGENATED POLYMERS

This application is a continuation-in-part of copending application, Ser. No. 481,320, filed Apr. 1, 1983.

BACKGROUND OF THE INVENTION

This invention relates to a method of modifying polymers with a halogen or halogens; specifically to a process for the production of halogenated polymers. More specifically, it is directed to a continuous process for the manufacture of halogenated polymers such as butyl (a copolymer of a major proportion of an isoolefin and a minor proportion of a multi-olefin) EPM (a copolymer of ethylene and propylene), EPDM (a terpolymer of ethylene, propylene and a nonconjugated diene), SBR (styrene-butadiene rubber), BR (polybutadiene rubber), polyisoprene rubber, various types of polyethylene, including linear low density polyethylene, ethylene vinyl acetate copolymer, etc.

Numerous references teach methods for halogenating various polymers. Generally, these references are limited to reactions in solution or are batch rather than continuous processes. There are, for example, references that teach the halogenation of butyl rubber, but each suffers from serious limitations. An early reference, U.S. Pat. No. 2,944,578, teaches that chlorinated butyl rubber can be produced in a batch process by dissolving butyl rubber in a suitable, nonreactive solvent, e.g., hexane, and introducing chlorine or a chlorinating agent. By suitable control of the temperature, concentrations of chlorinating agent and rubber, and reaction time, chlorinated rubber containing the desired level of chlorine is produced. However, a batch process is inherently inefficient and the need to dissolve the rubber in a solvent incurs significant expenses for solvent recovery and environmental control.

An improved, continuous process for chlorination or bromination of butyl rubber was subsequently disclosed in U.S. Pat. No. 3,099,644. However, that process still required the preparation and use of a solution of butyl rubber, which, in addition to the limitations noted above, is limited as to the concentration of rubber which can be processed, and which requires significant equipment and process control to precipitate the halogenated rubber from solution and then dry the rubber in a controlled manner so as to avoid degradation. The halogenation of ethylene-propylene nonconjugated diene elastomers (EPDM) has also been disclosed; such processes are analogous to those for halogenating butyl rubber. For example, U.S. Pat. No. 4,051,083 describes the solution bromination and chlorination of EPDM using N-halosuccinimide; additionally, the "neat" halogenation of EPDM is also described. In the latter disclosure the halogenating agent is dispersed in the EPDM by blending on a cool rubber mill and halogenation is effected by heating the mixture in a hydraulic press.

Halogenation of EPDM in an aqueous batch process is disclosed in U.S. Pat. No. 3,896,095. The process employs the addition of an excess of $Cl_2$ or $Br_2$ to a polymer slurry to effect halogenation and avoid the expense of solvent recovery systems previously disclosed for solution halogenation processes.

Chlorobromination of polymers such as polybutadiene, butadiene-isoprene copolymers and natural or synthetic polyisoprene is disclosed in British Pat. Nos. 1,483,063 and 1,483,064. The reaction is described as taking place at a low temperature of 0°–15° C., preferably in an inert solvent, and the halogenated products are described as containing high levels, e.g., at least 55% by weight of halogen.

A close reading of these references indicates the difficulty with which halogenation of elastomers has been conducted prior to the invention disclosed herein. The various limitations of these batch and continuous solution processes are overcome by the improved process of the present invention.

The possibility of producing a halogenated rubber such as halogenated butyl rubber continuously in an extruder-reactor has been recognized, see, e.g., U.S. Pat. No. 4,185,057. However, the generalized disclosures of that reference do no more than acknowledge the desirability of such a process, but do not teach one how to accomplish such a process. The reference suggests that only enough chlorine be introduced into the extruder to react with the butyl rubber so that no chlorine remains after reaction. It then goes on to suggest that another gas, e.g., nitrogen, be introduced to effect the production of gas filled pores in the finished rubber, which is the primary object of the invention.

No examples are disclosed in the patent and no conditions disclosed which would enable one to actually conduct such a butyl halogenation process. The invention disclosed herein provides a teaching sufficient to enable the practice of this unique halogenation process and apply such a teaching to the halogenation of various polymers.

Chlorination of butyl rubber using dichloramine-T and a calender has been reported by Bulgarian workers (Kh. Tenchev. et al, Chem Abstracts 50756u). The disclosed process was not intended to produce neat chlorinated butyl since calendering is carried out on a mixture of butyl rubber, accelerators, prevulcanization inhibitors as well as variable amounts of carbon black and dichloramine-T.

The halogenation, in a kneader or extruder, of polymers containing carboxylic acid groups using reagents that differ from those disclosed herein is described in U.S. Pat. No. 3,364,187. The polymers are converted to the acyl halide derivatives using specific halogenating agents. The patent suggests that the kneading step may be carried out in an extruder, a Banbury mixer, a roll mill or any other apparatus that yields the described kneading action.

A British Pat. No. 1,257,016, discloses a process for treating polymers with halogenating agents such as N-bromosuccinimide under mechanical shear for the purpose of producing unsaturation. The patent mentions that halogenation may possibly occur in an intermediate step followed by dehydrohalogenation, but production and isolation of a useful halogenated product is not an objective, nor is it achieved. The process also requires the use of scavenging amounts of a metal oxide or carbonate such as magnesium oxide, zinc oxide or calcium carbonate in addition to the halogenating agent and α-olefin polymer. The patent discloses, as an alternate method, the preblending of the halogenating agent with a solution of the polymer followed by solvent removal. It is stated that very little, if any, reaction occurs during such an operation.

An extensive disclosure of polymer modifications conducted in an extruder can be found in U.S. Pat. No. 3,862,265. This patent is directed to modification of polyolefins using heat, shear and controlled pressure to induce degradation in the polyolefin and to combine the polyolefin with a free-radical initiator and/or one or more monomers. The broad disclosure is of value for its teachings directed to the modification of polyolefins with various monomers especially to form novel grafted polymers.

Canadian Pat. No. 1,121,956 describes the treatment of blow-molded articles with fluorine gas to impart barrier properties to the article. It is achieved by introducing a mixture of fluorine and an inert gas into the interior surface of a parison before charging the parison into a blow-mold; the parison is then expanded by an inert gas under pressure. Such batchwise surface treatment method is not particularly relevant to the continuous whole-polymer modification process disclosed herein.

U.S. Pat No. 3,510,416 (Vaccari et al) teaches an improved method of halogenating PVC particles by using gaseous hydrogen in combination with a swelling agent (chlorination carrier). Following reaction, the PVC particles are transferred to another piece of equipment (a dryer) in which the chlorination carrier is stripped and gaseous by-products are separated. This reference discloses a process based on particle fluidization which relies on diffusion to accomplish drying; in addition, such a process requires separate pieces of equipment and relatively long times for drying.

Some polymers are particularly sensitive when exposed to shear and elevated temperatures in the presence of a halogenating agent. For example, butyl rubber is subject to degradation under such conditions and this has made the achievement of a halogenated butyl product using an extruder-reactor a difficult goal, and, until the invention described at the end of this section, a goal that had not yet been achieved. The halogenation reaction of butyl rubber in solution is described in "Encyclopedia of Chemical Technology", Kirk-Othmer, Third Edition (1979), Volume 8 at page 476 ff. It is noted that the halogenation reaction carried beyond one halogen atom per olefin unit is complicated by chain fragmentation. Indeed, such fragmentation or degradation is a persistent problem when halogenation of butyl rubber is attempted; that problem is aggravated under conditions of heat and shear.

An additional difficulty in this field of polymer modification is the dehydrohalogenation reaction. One means of suppressing such a reaction is the addition of stabilizers which can be added, e.g., to a solution of halogenated butyl to protect against this reaction during processing. It is also necessary to avoid other undesirable side reactions which vary depending on the particular polymer being halogenated. Such reactions are further aspects of the sensitivity of the polymers to the severe halogenation reaction that has made the achievement of controlled halogenation of neat polymers in an extruder-reactor a previously elusive goal.

Other difficulties which are encountered in attempting to halogenate neat polymers include: the problem of mixing a highly viscous polymer phase with a low viscosity halogenating agent phase (e.g., where a gaseous halogenating agent is used this difference can be as much as ten orders of magnitude); the low probability of the halogenating agent encountering the reactive site on the polymer, particularly when a low functionality polymer is employed (e.g., butyl rubber, isobutylene/isoprene copolymer); and the difficulty of removing from contact with the polymer, i.e., disengaging, potentially damaging by-products of the reaction, e.g., hydrogen halide. These problems and others have been overcome by the invention disclosed herein.

Conventional processes, which halogenate polymers such as butyl rubber in solution, incur significant disadvantages. These include high capital investment for the equipment needed to handle, purify, and recycle the solvent, high energy costs for the movement, vaporization, and purification and recycle of the solvent, potential halogenation of the solvent, potential hydrocarbon emissions to the atmosphere and the use of considerable space for the equipment necessary to handle large volumes of solutions.

A previous patent application, filed by two of the inventors herein (U.S. Ser. No. 306,882, filed Sept. 30, 1981 now U.S. Pat. No. 4,384,072 issued May 17, 1983) disclosed an improved halogenation process in which neat rubber was halogenated in an extruder. A significant feature of the earlier invention was injection of the halogenating agent at a position filled with rubber and subjecting the rubber and agent to a highdegree of mixing. The invention disclosed herein is a further, significant improvement over such a process.

SUMMARY OF THE INVENTION

In accordance with the present invention, an improved process has been discovered for the continuous production of halogenated polymers, the process comprising contacting a cohesive polymer mass and halogenating agent in a continuous flow device comprising means for conveying said polymer through said device wherein by-product of the halogenation reaction and unreacted halogenating agent are disengaged from said halogenated polymer mass, in said continuous flow device downstream of said contact between said polymer and said halogenating agent by means comprising deforming and disrupting said halogenated polymer, thereby continually generating new polymer surface and injecting an effective amount of inert gas in order to neutralize said halogenated polymer by disengaging halogenation reaction by-products and unreacted halogenating agent. In a preferred embodiment, the improved polymer halogenation process is conducted in an extruder-reactor comprising a feed zone, a reaction zone (preferably vented) and an inert gas injection neutralization zone. This improved process is subject to significantly reduced corrosion because of the absence of aqueous streams. The products of this process are useful for a wide range of applications including tires, innertubes, mechanical goods, hoses, and electrical products. Halogenated products containing reactive halogen, e.g., halogenated butyl rubber, are capable of being vulcanized with sulfur-free cure systems, for example, zinc oxide in combination with stearic acid; this halogenated rubber can also be vulcanized by standard sulfur and sulfur-donor-containing cure systems.

DESCRIPTION OF THE PREFERRED EMBODIMENTS

Polymers useful in the practice of this invention can be categorized in various ways and include:
(a) olefin polymers, such as the various forms of polyethylene, ethylene-propylene co-polymers, other ethylene copolymers with comonomers such as 1-butene, isobutylene, vinyl acetate, maleic anhydride, ethyl acrylate, methyl acrylate; generally alpha-olefin and cyclic olefin homopolymers and copolymers;

(b) polymers from dienes, such as styrene-butadiene rubber, polychloroprene (Neoprene), butyl, polybutadiene, polyisoprene, butadiene-acrylonitrile (Nitrile), ethylene-propylene-diene;

(c) vinyl and vinylidene polymers, such as polyvinyl chloride and its family of copolymers, polyvinyl esters such as polyvinyl acetate, acrylic polymers such as polymethylmethacrylate, polystyrene and its family of copolymers such as butadiene-styrene, styrene-acrylonitrile, styrene-isoprene, acrylonitrile-butadiene-styrene;

(d) heterochain thermoplastics, such as polyamides, polyesters, polyethers, polysulfides, polyurethanes, polycarbonates.

Unsaturated polymers useful in the present invention include ethylenically unsaturated elastomers, e.g., the several rubbers of commercial significance, for example, butyl rubber, EPDM rubber, styrene butadiene rubber (SBR), polyisoprene rubber and poly(butadiene-isoprene)copolymer rubbers.

The butyl rubber copolymers useful in the present invention contain a major proportion, preferably at least 70 wt.%, of isoolefins and a minor proportion, preferably not more than about 30 wt.%, of multi-olefins. Copolymers of this general type, especially where the copolymer contains about 85–99.5% (preferably 95–99.5%) of a $C_4$–$C_7$ isoolefin, such as isobutylene, with about 15–0.5% (preferably about 5–0.5 wt.%) of a multi-olefin of about 4–14 carbon atoms, are commonly referred to in patents and literature as "butyl rubber"; see, for example, the textbook "Synthetic Rubber" by G. S. Whitby (1954 edition by John Wiley and Sons, Inc.), pages 608–609, "Encyclopedia of Chemical Technology", Third Edition, Volume 8, (1979), pages 470–484, etc. The expression "butyl rubber" as employed in the specification and claims is intended to include copolymers containing about 80–99% by weight of an isoolefin of about 4–7 carbon atoms and about 20–1% of conjugated multi-olefin of about 4–10 carbon atoms. The preparation of butyl-type rubbers is amply described in the literature. In general, it consists of the reaction product of a $C_4$–$C_7$ isoolefin (preferably isobutylene) with a $C_4$–$C_{10}$ (preferably a $C_4$–$C_6$ conjugated diolefin, such as isoprene, butadiene, dimethyl butadiene, piperylene, etc. The reaction product of isobutylene and isoprene is preferred. The preparation of butyl rubber is described in U.S. Pat. No. 2,356,128 which is incorporated herein by reference.

Conventional high molecular weight butyl rubber generally has a number average molecular weight of about 25,000 to about 500,000, preferably about 80,000 to about 300,000, especially about 100,000 to about 250,000; and a Wijs Iodine No. of about 0.5 to 50, preferably 1 to 20. More recently low molecular weight polymers have also been prepared which have number average molecular weights of from 5,000 to 25,000 and unsaturation expressed as mole %, of 2–10.

The term "EPDM" as used in the specification and claims is used in the sense of its ASTM definition and is intended to mean a terpolymer containing ethylene and propylene in the backbone and diene enchainment with residual unsaturation in the sidechains. Illustrative methods for producing these terpolymers are found in U.S. Pat. No. 3,280,082, British Pat. No. 1,030,989 and French Pat. No. 1,386,600 which are incorporated herein by reference.

The preferred polymers contain about 45 to about 80 wt.% ethylene and about 1 to about 10 wt.% diene monomer. The balance of the polymer is propylene. Preferably, the polymer contains 45 to 70 wt.% ethylene, most preferably 50 to 60 wt.% ethylene, e.g., 56 wt.%, and about 2 to about 9 wt.% diene monomer, more preferably about 2 to about 6 wt.% diene monomer, most preferably 2.6 to 4 wt.% diene monomer. The diene monomer is a non-conjugated diene. Illustrative of these non-conjugated diene monomers which may be used in the terpolymer (EPDM) are hexadiene, dicyclopentadiene, ethylidene norbornene, methylene norbornene, propylidene norbornene and methyltetrahydroindene. A typical EPDM containing ethylidene norbornene as a diene monomer is Vistalon 4608 (Exxon Chemical Company, U.S.A.), a polymer having a Mooney viscosity at 260° F. of about 62, and an ethylene content of about 56 wt.%.

The polyisoprene rubber referred to in this invention may be natural rubber or synthetic polyisoprene prepared by processes well known in the art, and, in general, has a molecular weight of from about 500 to about 500,000, preferably about 1500 to about 200,000.

The polybutadiene and poly(butadiene-isoprene)-copolymer rubbers referred to in this invention include the geometric isomers thereof, all of which may be prepared by processes well known in the art. In general, such polymers and copolymers have a molecular weight of from about 500 to about 500,000, preferably from about 1500 to about 200,000. Generally, polybutadiene rubbers have Mooney viscosity values, measured at 212° F., of from about 25 to about 65, preferably from about 35 to about 55, most preferably from about 40 to about 50.

The styrene butadiene rubber referred to in this invention is also known as poly(butadiene-co-styrene), and typically abbreviated SBR, and includes rubbers prepared by the emulsion (hot and cold) and solution processes well known in the art. Bound styrene levels are from about 3 to about 50 wt.%, preferably from about 10 to about 45 wt.%, most preferably from about 12 to about 30 wt.%, for example, 23.5 wt.%. Generally, such polymers have Mooney viscosity values, measured at 212° F., of from about 20 to 130 and above, preferably from about 35 to about 80, most preferably from about 40 to about 70, for Example 52.

The butadiene in such copolymers is present as all three geometric isomers, cis-1,4, trans-1,4 and 1,2 or vinyl and the copolymer can be random, block or graft.

The elastomers or rubbers referred to above and processes for their preparation are generally described in the Kirk-Othmer "Encyclopedia or Chemical Technology", Third Edition, Volume 8, (1979), butyl p. 470 ff, EPDM p. 492 ff, polybutadiene p. 546 ff, polyisoprene p. 582 ff and poly(butadiene-co-styrene) p. 608 ff, incorporated herein by reference.

Some forms of halogenated butyl rubber, prepared in solution according to processes described above, are commercially available, e.g., chlorinated butyl rubber and brominated butyl rubber. One method used to prepare halogenated butyl rubber is that of halogenating butyl rubber in a solution (butyl rubber cement) containing between 1 to 60% by weight of butyl rubber in a substantially inert $C_5$–$C_8$ hydrocarbon solvent such as pentane, hexane, heptane, etc., and contacting this butyl rubber cement with a halogen for a period of up to about 25 minutes. There is then formed the halogenaed butyl rubber and a hydrogen halide, the polymer containing up to one or somewhat more halogen atoms per double bond initially present in the polymer. Generally, halogenated butyl rubber comprises a copolymer of 85 to 99.5 wt.% of a $C_4$ to $C_8$ isoolefin, e.g., isobutylene, with 15 to 0.5 wt.% of a $C_4$ to $C_{14}$ multi-olefin, e.g., isoprene, containing at least about 0.5 wt.% combined halogen in its structure. For example, where butyl is halogenated with bromine, the bromine can be present in the brominated butyl in an amount of from about 1.0 to about 3.0 wt.%, preferably from about 1.5 to about 2.5 wt.%. A method of preparing conventionally halogenated butyl rubber is described in U.S. Pat. No. 3,099,644, which is incorporated herein by reference.

The preparation, in solution, of halogenated butyl rubber containing both bromine and chlorine, i.e., bromochlorinated butyl rubber, is described in U.S. Pat. No. 4,254,240, incorporated herein by reference. The potential for molecular weight breakdown of the butyl rubber, noted earlier, is present even where bromine chloride is used as the halogenating agent, as disclosed in this reference (column 4, lines 24–32).

The invention disclosed herein is also particularly useful for the halogenation of saturated polymers. Such polymers include rubbers such as ethylene-propylene copolymers (EPM), generally known in the art and similar in their preparation and composition to EPDM terpolymers with the exception of the presence of residual unsaturation; also included is polyisobutylene rubber, produced commercially in grades varying as to molecular weight.

Other saturated polymers useful in the practice of the instant invention include olefin polymers such as high and low density polyethylene (HDPE and LDPE) and linear low density polyethylene (LLDPE), copolymers of ethylene such as ethylene-vinyl acetate, and polyvinyl and vinyl polymers, for example, polyvinyl chloride.

HDPE has a density of about 0.941 to about 0.965 g/cc. High density polyethylene is an established product of commerce and its manufacture and general properties are well known in the art. Typically, HDPE has a relatively broad molecular weight distribution, characterized by the ratio of weight average to number average molecular weight, of from about 20 to about 40. LDPE is, similarly, an item of commerce, and typically includes products with densities in the range of about 0.910 to about 0.925 g/cc. Medium density polyethylene should not be excluded as a useful polymer, e.g., about 0.925 to about 0.940 g/cc.

Linear low density polyethylene (LLDPE) is a relatively new class of low density polyethylene characterized by little, if any, long chain branching, in contrast to conventional low density polyethylene. The processes for producing LLDPE are well known in the art and commercial grades of this polyolefin plastic are available. Generally, it is produced in gas-phase fluidized bed reactors or liquid-phase solution process reactors; the former process can be carried out at pressures of about 100 to 300 psi and temperatures as low as 100° C. Polymers can be made in the gas phase with melt indices and densities over the full commercial range and with molecular weight distributions from very narrow to very broad.

Polyethylene copolymers include copolymers of ethylene and alpha-olefins having 3 to 16 carbon atoms, for example, propylene, 1-butene, etc. Also included are copolymers of ethylene with an unsaturated ester of a lower carboxylic acid. In particular, copolymers of ethylene with vinyl acetate or alkyl acrylates, for example, methyl acrylate and ethyl acrylate, are employed.

For the purposes of this invention, polyethylene copolymers are also considered to include blends of polyethylene and polyethylene copolymers. Many such ethylene copolymers are available as items of commerce and their composition and methods for producing them are well known in the art.

Polyvinyl chloride (PVC) is the most commercially significant member of the polyvinyl and vinyl copolymer family which comprises various polymers based on the vinyl radical or vinylidene radical. Vinyl chloride has been copolymerized with materials such as vinyl acetate, acrylic esters and vinylidene chloride. More recently other polymers have been grafted to polyvinyl chloride including ethylene vinyl acetate and EPDM. PVC is manufactured commercially using various well known polymerization processes: suspension, mass, emulsion/dispersion and solution; the first is the dominant method. The product is available in several forms including particles, fine powders and latexes.

The polymer and halogenating agent are contacted, or reacted, in a continuous flow device. Suitable devices include kneaders, extruders (employing single or multiple screws, e.g., twin screws), continuous mixers and a recently disclosed blending/extrusion device referred to as a cavity transfer mixer (see, e.g., European Rubber Journal, July–August, 1982, pages 29–32 and G. M. Gale, U.K. Patent Application No. 8030586, 1980). Although such polymers can attain very high viscosities, even at relatively high temperatures, such devices are capable of subjecting polymers to deformation.

The continuous flow device should be capable of initially forming the polymer feed into a cohesive mass and then deforming the polymer, disrupting the polymer surface, thereby exposing fresh, i.e., unreacted, polymer to the halogenating agent. The exposure of new surface does not necessarily require the use of high speeds where, e.g., an extruder is used. However, surface disrupting means are preferably employed (as will be described in detail below), for example, pins, reverse flow sections, a "Maillefer" screw design, the cavities of a cavity transfer mixer, multiple flight screw section, interrupted flight sections, e.g., slotted flights, and combinations thereof.

The deformation forces generated in the continuous flow device are adequate when such forces generate a degree of mixing of the polymer and halogenating agent such that the scale of segregation is, preferably, less than 50 microns, more preferably less than 30 microns, most preferably less than 10 microns. Characterization of the degree of mixing in a two-phase system according to scale of segregation is described in the text, "Principles of Polymer Processing", Z. Tadmor and C. G. Gogos (John Wiley and Sons, 1979), Section 7.5, pages 209 ff.

When the region in which the polymer and halogenating agent are brought into contact, e.g., the reaction zone of an extruder-reactor, is not filled with polymer, the halogenating agent is present as a continuous phase and the polymer is present as either a discontinuous or continuous phase; the former is preferred. When each constitute a continuous phase, for ease of reference this is referred to as "co-continuous phases". In this latter situation if the reaction zone was viewed under conditions where deformation of the polymer was stopped, the polymer and halogenating agent would each comprise an independent, continuous phase. A preferred operating mode of the process utilizes a reaction zone which is only partially filled with polymer; this permits reaction by-products and unreacted halogenating agent to disengage from the polymer phase. Generally, the polymer is present in the reaction zone to the extent that about 5 to about 95%, preferably 10 to about 75%, more preferably about 15 to about 50%, for example 20 to about 35% of the reaction zone is filled with the polymer. One means of achieving a partially filled reaction zone is to feed, in a controlled manner, less polymer into the reaction zone than the conveying capacity of the zone. The space above the polymer is occupied by the halogenating agent and, as fresh surface is exposed to the halogenating agent and halogenation occurs, hydrogen halide is released as a by-product of the reaction. The hydrogen halide "disengages" from the polymer and enters and is present in the halogenating agent phase. In a preferred embodiment, utilization of vent means in the reaction zone facilitates removal of the reaction by-product and unreacted halogenating agent. Another preferred embodiment imposes a vacuum on the vent means so as to more efficiently disengage by-product(s) and unreacted halogenating agent. The vent means comprises one or more vents in the contacting region.

Means are provided for contacting the halogenated polymer with neutralization means, for example a neutralizing agent. This can also be viewed as a means of disengaging unwanted reaction by-products and unreacted halogenating agent from the halogenated polymer. The neutralization means and the halogenated polymer can be conveyed concurrently or countercurrently through the continuous flow device; preferably in a neutralization zone following the contacting or reaction zone. The pH of the neutralized, halogenated polymer is, preferably, greater than about 5.0, more preferably greater than about 6.0, most preferably greater than about 7.0. In the improved process disclosed herein, neutralization is achieved in an aqueous-free manner by injecting an inert gas, e.g., nitrogen, argon, carbon dioxide or air, into said continuous flow device downstream of the contact between said polymer and said halogenating agent, e.g., in the neutralization zone.

Rapid and complete neutralization, i.e., disengagement, is effected by employing process features such as those described earlier with regard to polymer deformation and surface disruption in order to expose fresh polymer surface to the inert gas; similarly, the discussion of scale of segregation is relevant here with regard to the inert gas and polymer. In a preferred embodiment, disengagement occurs in a region of the continuous flow device which is not completely filled with polymer. In a still more preferred embodiment, vent means are provided so that the inert gas, unreacted halogenating agent and reaction by-products are removed from the polymer conveying means. The amount of inert gas employed can be readily determined and should be an amount effective for the disengagement without being unnecessarily wasteful. Inert gas injection can be achieved using more than one injection port and the halogenated polymer can again be treated in a supplementary scrubbing zone following neutralization in order to remove additional by-products and unreacted halogenating agent. Another option is a region for injecting a stabilizer into the continuous flow device following the inert gas treatment. In another embodiment, the inert gas injection and venting configuration is designed so as to permit explosive release of the injected inert gas from the halogenated polymer in order to facilitate in the removal of unwanted materials. Filter means can also be employed to remove undispersed material from the halogenated polymer. The absence of aqueous streams in the process results in significantly reduced corrosion of the process equipment. Furthermore, the halogenated product can be used directly or packaged directly without an intermediate drying step because of the absence of water.

Preferably the various zones which have been described are separated from one another in such a manner as to permit maximum independent control of conditions in each zone. Details and conditions are described below for a preferred embodiment utilizing an extruder-reactor, but the principles disclosed are broadly applicable to the system just discussed.

A preferred embodiment of the process employs an extruder-reactor. The extruder-reactor may be thought of as carrying out the halogenated polymer manufacture in various operating zones:

(A) Feed Zone—in which polymer is introduced into the extruder-reactor in convenient form. This form includes, for example, particles and pellets of plastics as they were produced commercially, particles from bales of rubber which have been comminuted and crumb from the finishing line of a rubber manufacturing plant, each of which is preferably dry, but may contain a low level, e.g., about 0 to 15 wt.%, preferably about 0 to 5 wt.%, most preferably about 0 to 1 wt.%, of a solvent or diluent; the latter materials will be described more fully below. In this improved process the use of water as a diluent is to be avoided in order to avoid corrosion.

The feed zone is designed to form the polymer feed into a cohesive mass and convey or pump the mass past a restrictive dam which follows the feed zone and distinguishes it from the reaction zone which follows. This operation should be conducted at low shear and temperature consistent with the desired result and at a pressure sufficient to convey the mass, typically up to about 600 psig, preferably up to about 400 psig, most preferably up to about 200 psig. Lower pressures are preferred in order to avoid overheating the polymer. This can be achieved, e.g., by utilizing an extruder screw with relatively deep flights and by keeping the length of the feed zone, i.e., the feed zone screw length, as short as possible commensurate with desired production rates. For example, polymer is introduced at about room temperature and exits from the feed zone at about 60° to 150° C.

A restrictive dam is used to separate the feed zone from the reaction zone which follows it so as to prevent back leakage of reactants. This dam is not restrictive enough, however, to cause excessive overheating of the polymer. A restrictive dam can be, for example, a reverse flighted screw section, a filled screw section, a shallow flighted screw section, an unflighted screw section, combinations thereof, or other means known in the art. If an unflighted screw section is employed, it can have a larger diameter than the root diameter upstream of it, for example 5–25% larger, but not greater than the screw flight diameter. The restrictive dam length should be about 0.5 to about 8 screw diameters, preferably about 1 to about 5 screw diameters, more preferably about 1.5 to about 4 screw diameters, most preferably about 2 to about 3 screw diameters in length. If a reverse flighted screw section is employed it can be single or multi-flighted, preferably multi-flighted.

It should be noted that where the restrictive dam configuration employed is more than a mere separation boundary or region between zones, for example, more than merely an unflighted screw section, the restrictive dam can be considered to be part of the reaction zone itself, for example when a single or multi-flighted reverse flighted screw section is employed. Under such circumstances, the restrictive dam in this region of the extruder-reactor can be a part of or comprise the reaction zone. When the reaction zone is operated under vacuum in a partially filled mode, the restrictiveness of the dam between the feed and reaction zone can be reduced so as to permit some gas (e.g., air) to flow into the reaction zone from the feed zone.

In addition to the polymer which is introduced into the feed zone, an optional diluent may also be added. A diluent can function to reduce the viscosity of the polymer to a level commensurate with subsequent good mixing and halogenation without the necessity for excessive heat and a risk of molecular weight breakdown and undesirable side reactions; it can also function to reduce the temperature of the polymer. The diluent may be volatile saturated hydrocarbon, chlorohydrocarbon or chlorocarbon such as pentane, hexane, methylene chloride, chloroform, or carbon tetrachloride. It may also be a non-hydrocarbon, readily removable from the system downstream, but able to perform the function of temporarily reducing the apparent viscosity of the rubber in the reaction zone. Examples of suitable materials include water, inert gases such as nitrogen and argon, as well as gases such as carbon dioxide and air.

The diluent may also be retained with or in the polymer, such as a hydrocarbon oil. Suitable oils include saturated aliphatic oil and rubber process oils such as paraffinic, naphthenic and aromatic types. Where such oils are utilized, the halogenated polymer would contain oil after recovery and drying and would commonly be referred to as "oil extended". Oil extended rubber is well known in the art and various grades of oil extended EPDM, SBR, and polybutadiene made by other means are commercially available. Such products are particularly useful where it is desirable, for example, to extend the rubber with high levels of filler, e.g., carbon black or mineral filler, to obtain properties from high molecular weight polymer which might otherwise be difficult to process because of its inherently high viscosity, etc.

The total amount of diluent, including that which may be present in the feed should not be greater than about 50 wt.% based on the polymer, preferably less than about 15 wt. %, most preferably about 5 to about 10 wt. %.

(B) Reaction Zone—can generally be described as the zone in which the halogenating agent is caused to react with the polymer to completely effect the halogenation reaction while simultaneously minimizing undesired side reactions. Screw configuration in the reaction zone is important to mixing efficiency and achievement of the overall objectives of the process. The configuration should be such as to cause disruption and reorientation of the flow of polymer, as, for example, by the aforementioned use of reverse flights, multiple reverse flights, pin sections, a series of very short alternating reverse and forward screw sections, multiple flight, interrupted flight sections and combinations thereof, and other designs known in the art to improve mixing. Viscosity control of the polymer, effected, in part, by the use of an optional diluent and by control of the molecular weight of the polymer and the polymer temperature as it enters the reaction zone, also determines, to a large extent, deformability. Selection of the temperature level influences the reaction and along with residence time in the reaction zone, the nature of the end product. For maximum economy and continuity of production the choice of materials of construction of the reaction zone is particularly important; this also influences the type and level of potential contaminants in the finished polymer and their influence on long-term storage stability of the polymer as well as chemical reactivity. This is discussed in further detail later in this disclosure.

Where a polymer such as butyl rubber is to be halogenated this process should preferably halogenate the rubber to the extent of about one halogen atom per double bond of olefinic unsaturation originally present in the rubber. Control is required in order to avoid over and under halogenation. This can be achieved by, for example, controlling the halogen feed rate in comparison to the rubber feed rate, design of the reaction zone (length, screw features and configuration, injection means, temperature, etc.) and RPM so as to determine time of reaction and to control the relative rates of the desired reaction versus competing side reactions (e.g., halogenation of the olefinic unsaturation as for example the isoprene moiety in butyl versus the isobutylene moiety). Additionally, design of the neutralization zone to effect rapid and complete neutralization is also important in controlling the nature of the halogenation.

The halogenating agent can be gaseous, liquid or solid and may be added either in a pure state or diluted with a suitable inert fluid as noted above. Suitable halogenating agents include chlorine, sulfuryl chloride, N-chlorosuccinimide, 1,3-dichloro-5,5-dimethylhydantoin iodobenzene dichloride, iodine monochloride, bromine, bromine chloride, sodium hypobromite, sulfur bromide and N-bromosuccinimide. Where gaseous chlorine, bromine or bromine chloride is used, gaseous diluents, e.g., nitrogen, argon, air, $CO_2$, etc., can be used when a diluent is desired.

At least under some conditions encountered in extruder halogenation, as, for example, where mixing butyl rubber and the halogenation agent are not as efficient as desired, the use of N-chlorosuccinimide may result in predominantly free-radical reactions rather than the preferred ionic reactions.

In this improved process alternative reaction zone mixing techniques are feasible. Injecting halogenating agent at a point or points filled with polymer can facilitate nearly instantaneous mixing. Alternatively the reaction can be allowed to occur at the continuously renewing polymer surface generated by the configuration of the reaction zone and conveying means, e.g., the extruder screw and barrel, in a reaction zone partially filled with polymer. Configuration of the screw and chamber walls should not be so restrictive as to cause excessive pressure and excessive shear heating of the polymer. Pressure at the point of injection need not be very high where the reaction zone is only partially filled with polymer and preferably vented. In addition, injection can be into the space occupied by the halogenating agent, e.g., the vapor space. A moderately positive injection pressure is suitable; the pressure selected should maintain a positive flow into the reaction zone and prevent plugging of the line. The specific pressure chosen is a matter of operating convenience. In the filled system, pressure at the point of injection is about 15 to about 400 psig, preferably 100 to about 300 psig.

Also important for achieving efficient reaction of the polymer and halogenating agent is the incorporation in the reaction zone of means to produce the level of polymer mixing and surface disruption preferred for the practice of this invention. As described earlier, this can be achieved, for example, by utilizing reverse flights on the reaction zone portion of the extruder screw, pins, etc. Other means include operation of the screw at a rotation rate of about 50 to about 600 RPM, preferably about 70 to about 400 RPM, most preferably about 90 to about 200 RPM, and by incorporation of a downstream restrictive dam, of the type described above, to separate the reaction zone from the neutralization zone which follows it.

Characterization of mixing by reference to the "scale of segregation" achieved between the halogenating agent and polymer (generally, any two-phase system) was noted earlier. A preferred scale of segregation in the practice of this invention is less than 50 microns, more preferably less than 30 microns, most preferably less than 10 microns.

Overall, it is desirable, by control of polymer viscosity, chamber and screw design, screw RPM, and operating pressure, to prevent excessive temperatures in the reaction zone while maintaining a high level of mixing. It is desirable that a temperature of less than about 170° C. be achieved, preferably less than about 140° C., most preferably less than about 120° C.

(C) Neutralization Zone—in which by-product HCl and/or HBr is neutralized to prevent dehydrohalogenation of the halogenated polymer and to suppress other undesirable side reactions and corrosion of the equipment. Suitable means to effect neutralization and remove residual unreacted halogenating reagent in this improved process is the injection of an inert gas into the extruder to "sweep out" the by-products and residual halogenation agent. This process is effected by employing process features such as those just described with regard to the reaction zone in order to disrupt the polymer surface and continually expose new surface to the inert gas in the neutralization zone. In a preferred embodiment vent means are provided in the neutralization zone to permit the inert gas and disengaged products to be swept out and immediately removed from the region near the polymer. In a particularly preferred embodiment, the screw configuration in the region of the vent comprises a deep, single flighted screw with little or no mixing occurring in the vicinity of the vent in order to avoid restricting the exiting flow of inert gas and disengaged materials. In another preferred embodiment various additives and/or stabilizers are added to the polymer in the neutralization zone. As discussed earlier, multiple injection sites can be used as well as a supplementary injection zone. In another embodiment, pressure in the system is controlled in order to explosively remove the unwanted products.

The neutralization zone is designed so that the inert gas contacts the reaction products from the reaction zone as soon as possible after the halogenation reaction in order to prevent dehydrohalogenation of the polymer. This is achieved by utilizing a dam between the reaction and neutralization zones which is as short as possible consistent with its functioning as a restrictive dam. The nature and configuration of various alternatives for the restrictive dam are described above in detail for the dam between the feed and reaction zones. The injection port for the inert gas can be located as close as possible to the downstream end of the dam or the neutralizing reagent can be injected so as to flow countercurrent to the flow of the halogenated product mixture.

(D) Scrubbing Zone—To achieve a halogenated polymer end product not containing usually undesirable materials, the neutralized halogenated rubber can be subjected to supplementary inert gas injection in a scrubbing zone. In a particularly preferred embodiment such scrubbing is performed within the extruder-reactor in a scrubbing zone (D) which sequentially follows neutralization zone (C) and which is traversed by the extruder screw means. In this zone a stream or several streams of inert gas can be run through countercurrent and/or co current to the flow of neutralized polymer so as to remove the last traces of the products and unreacted halogenating agent.

Polymer stabilizing agents can optionally be added in this zone. This can be done by incorporating the stabilizers at an injection point.

In the practice of this invention attention should be given to the temperatures of the neutralization and scrubbing streams when they are brought into contact with the halogenated polymer product so as not to subject the polymer to excessive cooling and increase in viscosity; in extreme circumstances the polymer might be subject to crystallization. Methods for preheating these streams and the temperatures and pressures which are required in order to maintain a continuous process are well within the abilities of those skilled in the polymer processing art.

(E) Exit Zone—Preferably the extruder-reactor comprises a final exit zone (E) in which the temperature of the halogenated polymer product is adjusted for delivery therefrom at a temperature below about 130° C., more preferably below about 120° C. and most preferably below about 100° C., as a contribution to the stability of the polymer. Also in the exit zone, stabilizer(s) may initially be added to the neutralized; halogenated polymer product if not added in the neutralization or scrubbing zone or additional stabilizer(s) can be added.

Suitable stabilizers for use in this process include slurries or solutions of butylated hydroxytoluene (BHT), calcium stearate, sodium stearate, multi-component stabilization systems such as those described in U.S. Pat. No. 4,130,519 to Roper et al, incorporated herein by reference, and other degradation, oxidation and/or dehydrohalogenation inhibitors well known in the art directed to the polymer being halogenated.

In addition to the extruder-reactor features just described, the process of this invention can also incorporate filter means known in the art to effect the separation of undispersed materials from the polymer, screw means of suitable configuration, as described above, transversing zones (A)–(E) inclusive to properly effect the operations disclosed in said zones (Including single and twin screws), a system for recycling any organic diluent that may be added to the feed zone and/or included with the halogenating agent and, optionally, means for back-mixing the extruded halogenated polymer to assure that the final packaged polymer is a homogeneous product.

Materials of construction are a significant consideration in the process herein since potentially corrosive reagents are employed. In addition to a concern for long equipment life, product stability needs to be considered if by-products of the corrosion process become incorporated into the polymer. In addition, halogenation chemistry can be affected if metals and corrosion by-products are present during the halogenation reaction. Materials of construction in the feed zone, reaction zone and neutralization zone are selected to prevent or minimize reaction of the equipment with the halogenating agent and the reaction by-products. Small amounts of such materials may cause undesirable side reactions to occur with various constituents of the polymer. Useful materials include those alloys known commercially as Hastelloy ®, steels coated with inert polymers such as fluorocarbons, ceramics, etc. Materials which have been found to be unsatisfactory where aqueous streams are present include series 300 stainless steels, and carbon steel. Due to the low level of corrosion in this process, other suitable materials include commercial alloys comprising nickel, cobalt, molybdenum, chromium and iron as major alloying elements; commercial alloys in this class include Hastelloy B and C, Xaloy ® 306, Stellite ® 6 and Triboloy ®. Titanium coated steel is also useful.

Another advantage for this process is that in the absence of aqueous streams, a dry, halogenated product is produced which can be used immediately or packaged (after cooling, if required). Additionally, the corrosion noted above is significantly reduced or may be eliminated.

The halogenated polymers of this invention can be processed in standard equipment used for each such polymer, such as internal mixers, mills, extruders, calenders, etc. Said polymers are amenable to conventional compounding practice and various fillers and extenders can be incorporated, e.g., various carbon blacks, clays, silicas, carbonates, oils, resins, waxes, etc.

As described previously, various halogenated polymers are produced by the process of this invention including halogenated linear low density polyethylene and halogenated butyl rubber. Halogenated butyl rubber of this invention may be cured or vulcanized by any of the prior art methods suitable for such halogenated rubbers, e.g., using sulfur, sulfur-containing curing agents (such as sulfenamide derivatives, benzothiazyl disulfide, tetramethylthiouram disulfide, alkyl phenol disulfide, etc.), zinc oxide alone or with various promoters, and mixtures thereof. Curing is usually accomplished at a temperature of from about 140° C. to about 250° C., preferably 150° C. to about 200° C., and usually takes from 1 to 150 minutes.

This invention will be further understood by reference to the following examples which describe equipment demonstrating the principles of this invention. In each of the examples, disruption of the halogenated polymer continued in the neutralization zone.

EXAMPLE 1

An extruder with 2" diameter twin screws, counter-rotating and non-intermeshing was set up according to the teachings herein in order to halogenate several polymers. The feed zone was 18 inches long and separated from the reaction zone by a reverse flighted section. The reaction zone was 28 inches long and separated from the neutralization zone with a reverse flighted section. The reaction zone utilized forwarding single, double and triple flights with slots cut in several of the triple flights. Additionally, some forwarding single sections had mixing pins in the stem. The configuration in the reaction zone was designed to increase mixing, interrupt polymer flow and expose fresh surface to the halogenating agent.

The halogenating agent was chlorine gas diluted with nitrogen (20-45%). Halogenating agent was injected at a slight positive pressure into the vapor space of the reaction zone at a point 6 inches downstream from the beginning of the zone. A vent reaction zone was used, with the vent located 24 inches from the beginning of the reaction zone.

Neutralization was achieved using nitrogen injection, countercurrent to polymer flow, at a rate of 0.5 Kg per hour. A second vent was located 15 inches from the end of the extruder:

| Polymer (a) | Cl, % | Maximum Temp, °C. | Screw RPM | Rate Kg/H |
|---|---|---|---|---|
| 1. HDPE | 0.38-0.72 | 160-175 | 300 | 25 |
| 2. EPM | 0.41-0.61 | 185-210 | 160 | 55 |
| 3. LLDPE | 0.62-3.64 | 145-165 | 100 | 25 |
| 4. PIB | 1.50-1.53 | 175-185 | 222 | 83 |
| 5. EVA | 2.55-4.74 | 140-160 | 90 | 45 |
| 6. EPDM | 2.46-3.55 | 160-220 | 156 | 40 |

(a) Polymer Identification:
1. High density polyethylene, Allied Chemical, AA60-003, 0.3 MI, 0.96 density.
2. Ethylene-propylene copolymer rubber, Exxon Chemical, Vistalon ®,503, 50 wt. % ethylene; typical Mooney viscosity at 127° C. = 30.
3. Linear low density polyethylene, Exxon Chemical, LPX-1 gas phase process, 1.0 MI, 0.918 density.
4. Polyisobutylene rubber, Exxon Chemical, Vistanex ® L-80, Staudinger molecular weight 64–81,000.
5. Ethylene vinyl acetate copolymer, VSI, VE 645, vinyl acetate = 28 wt. %, 3.0 MI, 0.95 density.
6. Ethylene-propylene diene rubber, Exxon Chemical, Vistalon 6505, high diene level, typical ethylene = 50 wt. %, typical Mooney @ 127° C. = 50.

These results demonstrate the broad applicability of this improved halogenation process.

EXAMPLE 2

An extruder with 2" diameter twin screws, counter-rotating and non-intermeshing was set up according to the teachings herein in order to halogenate butyl rubber (isobutylene-isoprene copolymer). The feed zone was 10 inches long and separated from the reaction zone by a reverse flighted section. The reaction zone was 47 inches long and separated from the neutralization zone with a reverse flighted section. The reaction zone utilized forwarding single, double and triple flights with slots cut in several of the triple flights. Additionally, some forwarding single sections had mixing pins in the stem. The configuration in the reaction zone was designed to increase mixing, interrupt polymer flow and expose fresh surface to the halogenating agent.

The halogenating agent was chlorine gas diluted with 5-10 wt.% nitrogen. Halogenating agent was injected at a slight positive pressure into the vapor space of the reaction zone at a point 2 inches downstream from the beginning of the reaction zone at a rate of about 4 Kg/hr. The reaction zone contains a vent located 36 inches from the halogenating agent injection point and the vent was vacuum supplemented.

Neutralization was achieved using nitrogen injected countercurrently, beginning 3 inches from the end of the extruder at a rate of 3.7 Kg/hr. A second vent was located 18 inches downstream of the reaction zone vent. Polymer feed rate was targeted at 40 Kg/hr. Halogenated polymer produced during this run had a chlorine content of 1.39 wt.%, viscosity average molecular weight of 391,000 and a rheometer cure of 10.7. (Torque at 30 minutes minus minimum torque, in-lb; Test Composition (parts by weight): 100-Rubber, 50-Dried IRB #5 Carbon Black, 3-Zinc Oxide, 1-Stearic Acid. Rheometer Conditions: 160° C., 5° Arc, 30-minute test, 100 cycles per minute oscillation.) Weight measurement taken of the extruder screw parts before and after the run indicated no evidence of corrosion. The halogenated polymer was compounded in the test formulation directly as produced; no intermediate drying was required since no water was used in the process.

What we claim is:

1. A process for the continuous production of halogenated polymer, the process comprising contacting a cohesive polymer mass and halogenating agent in a continuous flow device comprising means for conveying said polymer through said device wherein by-product of the halogenation reaction and unreacted halogenating agent are disengaged from said halogenated polymer mass in said continuous flow device downstream of said contact between said polymer and said halogenating agent by means comprising deforming and disrupting said halogenated polymer, thereby continually generating new polymer surface and injecting an effective amount of inert gas thereby neutralizing said halogenated polymer by disengaging halogenation reaction by-products and unreacted halogenating agent.

2. The process of claim 1 wherein said polymer mass is subjected to deformation and disruption and wherein said polymer and said halogenating agent are present during contact as either co-continuous phases or wherein said halogenating agent is present as a continuous phase and said polymer is present as a discontinuous phase or wherein the region in which said polymer and said halogenating agent are contacted is filled with said polymer.

3. The process of claim 1 wherein said polymer is an ethylenically unsaturated polymer selected from the group consisting of butyl rubber, EPDM rubber, styrene butadiene rubber, polyisoprene rubber, polybutadiene rubber and poly(butadien-isoprene) copolymer rubber.

4. The process of claim 1 wherein said polymer is selected from the group consisting of polyisobutylene, ethylene-propylene copolymer, high density polyethylene, low density polyethylene, linear low density polyethylene, ethylene-vinyl acetate copolymer and polyvinyl chloride.

5. The process of claim 3 wherein said rubber is butyl rubber.

6. The process of claim 3 wherein said rubber is EPDM rubber.

7. The process of claim 4 wherein said saturated polymer is linear low density polyethylene.

8. The process of claim 5 wherein said butyl rubber is isobutylene-isoprene copolymer.

9. The process of claim 1 wherein said halogenating agent is selected from the group consisting of chlorine gas, chlorine liquid, sulfuryl chloride, N-chlorosuccinimide, 1,3-dihalo-5, 5-dimethylhydantoin, iodobenzene dichloride, iodine monochloride, bromine gas, bromine liquid, bromine chloride, sodium hypobromite, sulfur bromide and N-bromosuccinimide.

10. The process of claim 1, further comprising adding a diluent to said rubber feed before, at or near the point of addition of said feed.

11. The process of claim 10 wherein said diluent is selected from the group consisting of volatile saturated hydrocarbons, chlorohydrocarbons, chlorocarbons, non-hydrocarbons, and hydrocarbon oils.

12. The process of claim 11 wherein said diluent is selected from the group consisting of pentane, hexane, methylene chloride, chloroform, carbon tetrachloride, carbon dioxide, and inert gas.

13. The process of claim 12 wherein said diluent is present in an amount less than about 50 percent by weight based on the weight of rubber.

14. The process of claim 8 wherein said halogenating agent is selected from the group consisting of bromine, chlorine and bromine chloride.

15. The process of claim 8 wherein said halogenating agent is diluted with diluent.

16. The process of claim 15 wherein said halogenating agent is chlorine.

17. The process of claim 15 wherein said diluent is a gas selected from the group consisting of nitrogen, argon, air and $CO_2$.

18. The process of claim 10 wherein said halogenating agent is diluted with a diluent and wherein the total amount of diluent added to said feed and halogenating agent diluent is less than about 50 percent by weight based on the weight of polymer.

19. The process of claim 18 wherein said diluent added to said feed is selected from the group consisting of volatile saturated hydrocarbons, chlorohydrocarbons, chlorocarbons and hydrocarbon oils.

20. The process of claim 1 further comprising vent means in the inert gas injection region.

21. The process of claim 1 further comprising pressure control means in the inert gas injection region in order to explosively disengage said halogenation reaction by-products and said unreacted halogenating agent.

22. The process of claim 1 wherein said injected inert gas and said halogenated polymer are conveyed co-currently or countercurrently through said device in a neutralization zone following contact between said polymer and halogenating agent.

23. The process of claim 22 wherein said co-current conveyance of said neutralizing means is initiated at the beginning of said neutralization zone or shortly thereafter.

24. The process of claim 20 further comprising a supplementary inert gas injection step.

25. The process of claim 24 wherein said supplementary injection step is performed in a separate scrubbing zone.

26. The process of claim 20 further comprising a stabilizer addition zone wherein a degradation, oxidation or dehydrohalogenation stabilizer is added to said halogenated polymer.

27. The process of claim 24 wherein a degradation, oxidation or dehydrohalogenation stabilizer is added following said supplementary inert gas injections step.

28. The process of claim 1 further comprising a final exit zone.

29. The process of claim 28 wherein the temperature of said halogenated rubber is adjusted for delivery from said exit zone at a temperature lower than about 130° C.

30. The process of claim 28 wherein a degradation, oxidation or dehydrohalogenation stabilizer is added to said exit zone.

31. The process of claim 24 further comprising filter means to effect the separation of undispersed materials from said halogenated polymer.

32. The process of claim 20 wherein said vent means are under vacuum.

33. The process of claim 1 wherein said contact occurs in a vented reaction zone.

34. The process of claim 1 wherein said continuous flow device is selected from the group consisting of a kneader, a single- or multiple screw extruder and a continuous mixer, and a cavity transfer mixer.

35. The process of claim 1 wherein said means for conveying said polymer is screw means.

36. The process of claim 1 wherein said deformation and disruption generates a degree of mixing of said halogenated polymer and inert gas such that the scale of segregation is less than 50 microns.

37. A process for the continuous production of halogenated polymer, the process comprising reacting said polymer and a halogenating agent in an extruder-reactor, said extruder-reactor comprising zones (A), (B) and (C) and conveying means traversing said zones; zone A, feed zone, in which conditions of temperature and pressure are sufficient to generate a cohesive polymer mass; zone (B), reaction zone, in which said halogenating agent and said polymer are contacted, resulting in a product mixture comprising halogenated polymer, reaction by-products and unreacted halogenating agent; and zone (C), neutralization zone, wherein reaction by-products and unreacted halogenating agent are disengaged from said halogenated polymer mass by means comprising deforming and disrupting said halogenated polymer, thereby continually generating new polymer surface and injecting an effective amount of inert gas thereby neutralizing said halogenated polymer by disengaging halogenation reaction by-products and unreacted halogenating agent.

38. The process of claim 37 further comprising first flow restriction means between zones A and B, and second flow restriction means between zones B and C.

39. The process of claim 32 wherein a vacuum is applied to said vent means.

40. The process of claim 37 wherein said deformation and disruption generates a degree of mixing of said halogenated polymer and inert gas such that the scale of segregation is less than 50 microns.

41. The process of claim 38 wherein said restriction means following said feed zone is selected from the group consisting of a reverse flighted screw section, a filled screw section, a shallow flighted screw section, and an unflighted screw section.

42. The process of claim 41 wherein said restriction means is about 0.5 to about 8 screw diameters in length.

43. The process of claim 38 wherein said restriction means following said feed zone comprises said reaction zone.

44. The process of claim 37 wherein said means for producing said deformation is selected from the group consisting of a reverse flighted screw section, a multiple reverse flighted screw section, a pin section, a series of very short alternating reverse and forward screw sections, multiple flight screw section, interrupted flight section, a cavity transfer mixer, and combinations thereof.

45. The process of claim 38 wherein said restriction means separating said neutralization zone from said reaction zone is selected from the group consisting of a reverse flighted screw section, a filled screw section, a shallow flighted screw section, and an unflighted screw section.

46. The process of claim 38 wherein each of said restriction means is an unflighted screw section with a diameter of from 5 to 25 percent larger than the root diameter of the upstream screw section, but not greater than the upstream screw flight diameter.

47. The process of claim 37 wherein said conveying means is screw means.

48. The process of claim 47 wherein said screw means is selected from the group consisting of single and multiple screws.

49. The process of claim 47 wherein said shear forces are generated in said reaction zone by operating said screw means at a rotation rate of from 50 to 600 RPM.

50. The process of claim 37 wherein the material used in the construction of one or more of said zones is selected from the group consisting of alloys comprising nickel, cobalt, molybdenum, chromium and iron as major alloying elements, and steel coated with inert polymer, ceramic or titanium.

51. The process of claim 37 wherein the polymer in the feed zone is subjected to a pressure of up to about 600 psig.

52. The process of claim 38 wherein said inert gas is injected at or adjacent the downstream end of said second restriction means.

53. The process of claim 37 wherein said inert gas is injected into said neutralization zone so as to flow countercurrent to the flow of said halogenated product mixture.

54. The process of claim 37 further comprising a supplementary inert gas injection step.

55. The process of claim 54 wherein said supplementary injection step is performed in a separate scrubbing zone (D) which follows said neutralization zone, prior to delivering said halogenated polymer product.

56. The process of claim 37 further comprising a final exit zone (E).

57. The process of claim 37 further comprising stabilizer addition wherein a degradation, oxidation or dehydrohalogenation stabilizer is added to said halogenated polymer.

58. The process of claim 56 wherein the temperature of said halogenated polymer is adjusted for delivery from said exit zone at a temperature lower than about 130° C.

59. The process of claim 54 wherein a degradation, oxidation or dehydrohalogenation stabilizer is added in said supplementary inert gas injection step.

60. The process of claim 56 wherein a degradation, oxidation, or dehydrohalogenation stabilizer is added to said exit zone.

61. The process of claim 55 wherein said extruder-reactor further comprises filter means to effect the separation of undispersed materials from said halogenated polymer.

62. The process of claim 37 wherein said polymer mass is subjected to deformation and disruption in said reaction zone and wherein said polymer and said halogenating agent form co-continuous phases within said reaction zone or are present during contact as either co-continuous phases or wherein said halogenating agent is present as a continuous phase and said polymer is present as a discontinuous phase or wherein said halogenating agent is injected at a position filled with said polymer.

63. The process of claim 62 wherein said polymer is an ethylenically unsaturated polymer selected from the group consisting of butyl rubber, EPDM rubber, styrene butadiene rubber, polyisoprene rubber, polybutadiene rubber and poly(butadiene-isoprene)copolymer rubber.

64. The process of claim 37 wherein said polymer is selected from the group of saturated polymers consisting of polyisobutylene, ethylene-propylene copolymer, high density polyethylene, low density polyethylene, linear low density polyethylene, ethylene-vinyl acetate copolymer and polyvinyl chloride.

65. The process of claim 63 wherein said rubber is butyl rubber.

66. The process of claim 63 wherein said rubber is EPDM rubber.

67. The process of claim 64 wherein said saturated polymer is linear low density polyethylene.

68. The process of claim 65 wherein said butyl rubber is isobutylene-isoprene copolymer.

69. The process of claim 37 wherein said halogenating agent is selected from the group consisting of chlorine gas, chlorine liquid, sulfuryl chloride, N-chlorosuccinimide, 1,3-dihalo-5,5-dimethylhydantoin, iodobenzene dichloride, iodine monochloride, bromine gas, bromine liquid, bromine chloride, sodium hypobromite, sulfur bromide and N-bromosuccinimide.

70. The process of claim 37 further comprising adding a diluent to said rubber feed before, at or near the point of addition of said feed.

71. The process of claim 70 wherein said diluent is selected from the group consisting of volatile saturated hydrocarbons, chlorohydrocarbons, chlorocarbons, non-hydrocarbons and hydrocarbon oils.

72. The process of claim 71 wherein said diluent is selected from the group consisting of pentane, hexane, methylene chloride, chloroform, carbon tetrachloride, carbon dioxide, and inert gas.

73. The process of claim 72 wherein said diluent is present in an amount less than about 50 percent by weight based on the weight of rubber.

74. The process of claim 69 wherein said halogenating agent is selected from the group consisting of bromine, chlorine and bromine chloride.

75. The process of claim 69 wherein said halogenating agent is diluted with diluent.

76. The process of claim 75 wherein said halogenating agent is chlorine.

77. The process of claim 75 wherein said diluent is a gas selected from the group consisting of nitrogen, argon, air and $CO_2$.

78. The process of claim 70 wherein said halogenating agent is diluted with a diluent and wherein the total amount of diluent added to said feed and halogenating agent diluent is less than about 50 percent by weight based on the weight of butyl rubber.

79. The process of claim 70 wherein said diluent added to said feed is selected from the group consisting of volatile saturated hydrocarbons, chlorohydrocarbons, chlorocarbons and hydrocarbon oils.

80. The process of claim 68 wherein the temperature in said reaction zone is less than about 170° C.

81. The process of claim 37 further comprising vent means in said neutralization zone.

82. The process of claim 81 wherein said conveying means comprises screw means wherein said screw means is configured so as to avoid restricting the exiting flow of inert gas and disengaged materials.

* * * * *